May 8, 1962 T. POORTER 3,034,067

TRANSISTOR-AMPLIFYING CASCADE OF LOW NOISE LEVEL

Filed Nov. 27, 1959

INVENTOR
*T. POORTER*

BY
Frank R. Trifari
AGENT

United States Patent Office 3,034,067
Patented May 8, 1962

3,034,067

TRANSISTOR-AMPLIFYING CASCADE OF LOW NOISE LEVEL

Teunis Poorter, Eindhoven, Netherlands, assignor to North American Philips Company, Inc., New York, N.Y., a corporation of Delaware Filed Nov. 27, 1959, Ser. No. 855,754
Claims priority, application Germany Dec. 2, 1958
4 Claims. (Cl. 330—25)

For stabilizing the operating point of a transistor in a cascade of amplifying transistors, it has been proposed to directly connect a preceding transistor of the cascade having a stabilized operating point into the emitter circuit of the transistor to be stabilized, so that the high emitter-collector-internal resistance of the preceding transistor has a stabilizing effect on the operating point of the following transistor. The present invention applies this principle for operating point stabilization in a transistor amplifying cascade having a low noise level. It has the feature that the collector direct current of a following transistor of the cascade, the operating point of which is preferably stabilized by means of an emitter-resistor and a base voltage divider, is coupled to the emitter-collector-path of the first transistor comprising a high internal base-resistor.

In order that the invention may be readily carried into effect an example will now be described in detail with reference to the accompanying drawing, wherein.

Figure 1:
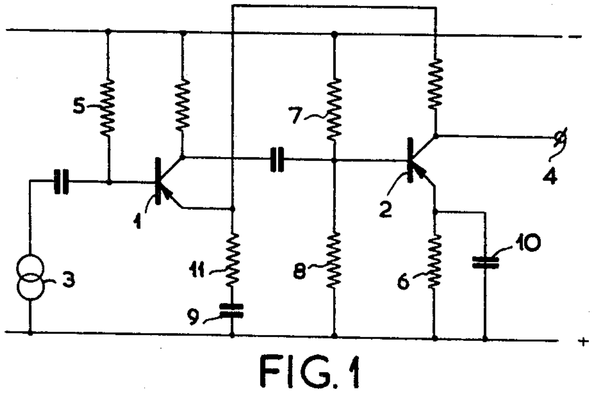
FIG. 1 is a schematic circuit diagram of one embodiment of the invention.

FIG. 1 shows a cascade-arrangement of two transistors 1 and 2, the input circuit of the transistor 1 comprising a high ohmic signal source 3 and the output signal being taken from a terminal 4. The transistor 1 is adjusted to an exceedingly low bias current, for example 300/μa., for which purpose a high ohmic base-resistor 5 (for example 50 to 500K ohms) is used. As a matter of fact, it has been found that the equivalent source of noise current at the input of the amplifier as a function of bias current has a minimum value at this low value of the bias current, so that the signal-to-noise ratio is a maximum at this low value. When the resistor 5 has a value equal to 50K ohms, it is found that the equivalent noise current is approximately 10% higher than if the resistor could be given an infinitely high value.

Owing to this high value of the resistor 5 the operating point of the transistor 1 will vary considerably with the temperature. To compensate for this effect, the emitter-circuit of the transistor 1 could include a stabilization resistor and the base could be connected, through a low value resistor, to the end of the stabilization resistor remote from the emitter; however, insertion of this low base-resistor, would entail a considerable increase of the equivalent noise current.

In accordance with the invention, the operating point of transistor 1 is stabilized by means of the collector direct current of the transistor 2, the operating point of which has been stabilized in the usual manner by means of an emitter-resistor 6 and a base-voltage divider 7, 8; the collector direct current of transistor 2 is passed through the emitter-collector path of the transistor 1. The emitter direct current variations occurring in the transistor 1 then substantially correspond to the direct current variations in the transistor 2, which latter variations remain within permissible limits by the action of the resistor 6 and the potentiometer 7, 8. Due to the internal resistance of the transistor 2 increased by the direct current negative feedback, the corresponding collector current variations in the transistor 1 are only slightly higher.

Figure 2:
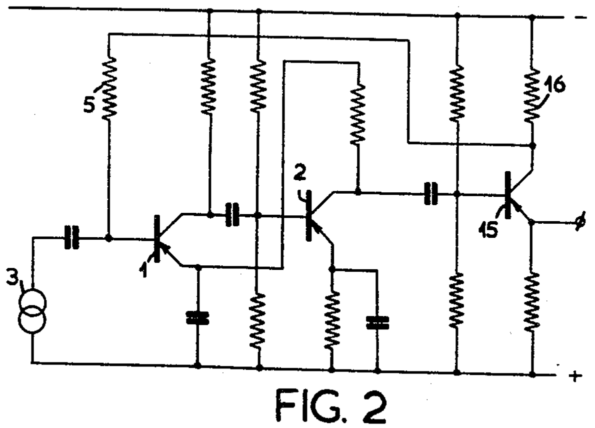
FIG. 2 is a schematic circuit diagram of a second embodiment.

The emitters of the transistors 1 and 2 are connected to the supply, preferably through decoupling capacitors 9, 10 respectively. For obtaining negative feedback a resistor, which also increases the input impedance of the circuit, may be connected in the series circuit between the emitter of the transistor 1 and the capacitor 9. When using a signal source 3 having a high internal resistance, the negative feedback shown in FIG. 2 may be employed with success. In this figure another transistor 15 is connected following the transistor 2 and the base-resistor 5 of the transistor 1 is connected to the collector of the transistor 15 so as to produce negative feedback. The transistor 15 may, for example, be operated in so-called common collector-arrangement so as to form at the output terminal, which is connected to the emitter of the transistor 15, a voltage source having a low internal resistance, for example for connecting a cable. In this case, the collector-resistor 16 may have a comparatively high value so as to produce a strong negative feedback.

What is claimed is:

1. A transistor amplifier arrangement comprising first and second transistors each having emitter, base and collector electrodes, signal input means connected to the base electrode of said first transistor, a direct-current blocking impedance coupling the collector electrode of the first transistor to the base electrode of the second transistor, said impedance constituting the sole path between said electrodes and blocking all direct-current flow therebetween, a source of power supply, a high ohmic resistor connected between one terminal of said source and the base electrode of the first transistor providing a low forward bias current and a low noise level at the base electrode of the first transistor, means for stabilizing the operating point of the second transistor, and a direct-current conductive circuit connection connected from the collector of the second transistor to the emitter-collector path of the first transistor providing the sole path for substantially the entire collector direct current of said second transistor, thereby stabilizing the operating point of the first transistor.

2. A circuit arrangement as claimed in claim 1, wherein said means for stabilizing the operating point of the second transistor includes a resistor connected between the emitter of the second transistor and one terminal of the source and a voltage divider connected across the source terminals, the center point of the voltage divider being connected to the base of the second transistor.

3. A transistor amplifier arrangement comprising first and second transistors each having emitter, base and collector electrodes, signal input means connected to the base electrode of said first transistor, a direct-current blocking impedance coupling the collector electrode of the first transistor to the base electrode of the second transistor said impedance constituting the sole path between said electrodes and blocking all direct-current flow therebetween, a source of power supply, a high ohmic resistor connected between one terminal of said source and the base electrode of the first transistor providing a low forward bias current and a low noise level at the base electrode of the first transistor, a resistor and a blocking capacitor connected in series between the emitter of the first transistor and one terminal of said source, said resistor increasing the input resistance of the first transistor and providing a negative feedback coupling for the signal to be amplified, and a direct-current conductive circuit connection connected from the collector of the second transistor to the emitter-collector path of the first transistor providing the sole path for substantially the entire collector direct current of said second transistor, thereby stabilizing the operating point of the first transistor.

4. A transistor amplifier arrangement comprising first, second and third transistors each having emitter, base and collector electrodes, signal input means connected to the base electrode of said first transistor, a direct-current blocking impedance coupling the collector electrode of the first transistor to the base electrode of the second transistor, a source of power supply, a high ohmic resistor connected between one terminal of said source and the base electrode of the first transistor providing a low forward bias current and a low noise level at the base electrode of the first transistor, means for stabilizing the operating point of the second transistor, a direct-current conductive circuit connection connected from the collector of the second transistor to the emitter-collector path of the first transistor, the collector of the second transistor being coupled to the base of the third transistor, said high ohmic resistor being direct-current conductively coupled to the collector electrode of the third transistor.

References Cited in the file of this patent

UNITED STATES PATENTS

| | | |
|---|---|---|
| 2,831,968 | Stanley et al. | Apr. 22, 1958 |
| 2,885,494 | Darlington | May 5, 1959 |
| 2,900,456 | Davidson | Aug. 18, 1959 |